(12) United States Patent
Pearce, III et al.

(10) Patent No.: US 10,590,640 B2
(45) Date of Patent: Mar. 17, 2020

(54) AUTOMATED PLUMBING SYSTEM SENSOR WARNING SYSTEM AND METHOD

(71) Applicant: NCH Corporation, Irving, TX (US)

(72) Inventors: Robert C. Pearce, III, Arlington, TX (US); Christopher James Laney, Fort Worth, TX (US); Alesia Sigler, Dallas, TX (US); Alex Erdman, Arlington, TX (US)

(73) Assignee: NCH Corporation, Irving, TX (US)

( * ) Notice: Subject to any disclaimer, the term of this patent is extended or adjusted under 35 U.S.C. 154(b) by 0 days.

(21) Appl. No.: 16/019,748

(22) Filed: Jun. 27, 2018

(65) Prior Publication Data

US 2018/0371740 A1 Dec. 27, 2018

Related U.S. Application Data

(60) Provisional application No. 62/525,418, filed on Jun. 27, 2017.

(51) Int. Cl.
*E03F 7/00* (2006.01)
*E03C 1/22* (2006.01)
*E03C 1/24* (2006.01)
*B01D 35/143* (2006.01)
*G08B 21/18* (2006.01)
*E03C 1/122* (2006.01)
*E03C 1/264* (2006.01)

(52) U.S. Cl.
CPC ............ *E03F 7/00* (2013.01); *B01D 35/1435* (2013.01); *E03C 1/1222* (2013.01); *E03C 1/22* (2013.01); *E03C 1/24* (2013.01); *E03C 1/264* (2013.01); *G08B 21/182* (2013.01); *E03C 2001/2406* (2013.01); *E03F 2201/40* (2013.01)

(58) Field of Classification Search
CPC ..... E03F 7/00; E03C 1/22; E03C 1/34; B01D 35/1435; G08B 21/182
USPC ......................................................... 340/608
See application file for complete search history.

(56) References Cited

U.S. PATENT DOCUMENTS

| | | | |
|---|---|---|---|
| 8,059,004 B2 | 11/2011 | James et al. | |
| 9,123,230 B2 | 9/2015 | Rogers | |
| 2011/0025511 A1* | 2/2011 | Wien | F17D 5/06 340/605 |
| 2011/0046903 A1 | 2/2011 | Franklin | |
| 2013/0133750 A1 | 5/2013 | Lescure et al. | |

(Continued)

*Primary Examiner* — Eric Blount
(74) *Attorney, Agent, or Firm* — Ross Barnes LLP; Robin L Barnes

(57) ABSTRACT

A standing water alert system comprises two conductive wires or a float extending into a drain and connected to an audible or visual alarm that is triggered when standing water is present. A drain alert system and method comprises a plurality of sensors, such as pressure or acoustic/vibration sensors, at various locations within a plumbing or fluid filtration system to measure pressure or an acoustic profile at that location and a control system to compare the measured parameters to a threshold value or range and/or to other measured parameters from nearby sensor locations. A signal is sent to a remote user or computer or an alarm is triggered when the comparison shows a potential blockage, a leak, or indicating that a filter needs to be replaced or cleaned. An approximate location of the blockage, leak, or fouled filter is determined by comparing measured parameters at nearby sensor locations.

40 Claims, 5 Drawing Sheets

(56) References Cited

U.S. PATENT DOCUMENTS

| | | |
|---|---|---|
| 2014/0130577 A1 | 5/2014 | Chatzigeorgiou et al. |
| 2015/0082868 A1 | 3/2015 | Hyland et al. |
| 2017/0306608 A1* | 10/2017 | Goldberg .............. G01F 23/164 |
| 2018/0190093 A1* | 7/2018 | Krula ..................... G08B 19/00 |
| 2018/0293877 A1* | 10/2018 | Barth ..................... G08B 21/18 |

* cited by examiner

AUTOMATED PLUMBING SYSTEM SENSOR WARNING SYSTEM AND METHOD

CROSS REFERENCE TO RELATED APPLICATION

This application claims the benefit of U.S. Provisional Application Ser. No. 62/525,418 filed on Jun. 27, 2017.

BACKGROUND OF THE INVENTION

1. Field of the Invention

The present invention relates to a system and method for detecting drain and sewage pipe blockages, piping leaks, and air filter blockages, and alerting a user of the blockage, leak, or potential for overflowing fixtures and backup of sewage lines.

2. Description of Related Art

Overflowing drains and sewer line backups caused by a clog or blockage in the pipe downstream from a fixture or drain can cause significant damage to property and can be a health hazard. Various alarming devices are known in the prior art to sound an alarm when water levels in a piping system rise due to a blockage. For example, U.S. Pat. No. 8,059,004 discloses an alarm system installed on the cap of a cleanout on a drain pipe that senses a clog at the cleanout. U.S. Pat. No. 9,123,230 discloses inserting a float connected to an alarm mechanism into an existing cleanout or a tee added to an existing sewer line to detect a blockage. There is a need for an easily installable alarm system that will alert a user to a blockage on the drain of an individual fixture. There is also a need for an easily installable alarm system that can sense and identify an approximate location for a blockage in a multi-level building or home.

SUMMARY OF THE INVENTION

A drain alert system according to one preferred embodiment of the invention comprises an alarm and conductive leads that sense standing water. The alarm, which is preferably a light (such as an LED) or device capable of making an audible sound (such as a beep), is disposed in or near a drain (and may be attached to an existing strainer on the drain) on an individual fixture, such as a sink, shower, or bathtub. The conductive leads extend down the drain pipe, hanging from the alarm or the strainer, and send a signal to the alarm when the water level in the drain pipe rises above the location of the leads. Preferably, the leads are long enough to extend down the drain pipe a distance from the top of the drain (or strainer) without making contact with the bottom of the P-trap (if one exists on the drain). A power source, such as a battery is preferably connected to the alarm and the leads. When water connects both leads (when the fixture is not in use), it activates the alarm to alert a user that there is a blockage in the drain or downstream of the drain that is causing the water to not drain properly.

According to another preferred embodiment, the invention comprises an alarm and a float switch that senses rising water in a drain pipe indicating a blockage. The alarm, which is preferably a light (such as an LED) or device capable of making an audible sound (such as a beep), is disposed in or near a drain (and may be attached to an existing strainer on the drain) on an individual fixture, such as a sink, shower, or bathtub. The float switch extends down the drain pipe, hanging from the alarm or the strainer, and sends a signal to the alarm when the water level in the drain pipe causes the float to rise above its fully extended resting position (when there is no clog causing water to fill the pipe around the float). A change in position of the float from its normal, fully extended position is detected by the float switch, which then triggers the alarm. Preferably, the float line is long enough to extend down the drain pipe a distance from the top of the drain (or strainer) without making contact with the bottom of the P-trap (if one exists on the drain). A power source, such as a battery is preferably connected to the alarm and the float switch. When the float changes vertical position, it activates the alarm to alert a user that there is a blockage in the drain or downstream of the drain that is causing the water to not drain properly.

A drain alert system according to another preferred embodiment comprises two or more sensors or sensor nodes connected to a vent stack, drain pipe, and/or cleanout in a plumbing system, a controller, and an alarm. The controller receives signals from the sensors indicating a sensed parameter in the plumbing system at the location of the particular sensor. The controller compares the signals to a predetermined threshold value to see if the sensed parameter is higher than or lower than the threshold value, which would indicate a blockage in the plumbing system. The controller may also compare the signals from adjacent or nearby sensors to determine where there is a differential in the plumbing system, which would indicate a blockage at a location between those sensors. When the controller detects a blockage, an alarm is triggered.

According to another preferred embodiment, the sensors are pressure sensors and at least one pressure sensor is connected to a first stack (such as the main vent stack in a building), and more preferably at least one pressure sensor is connected to a drain pipe connected to the first stack or a cleanout for the first stack. According to another preferred embodiment at least one pressure sensor is connected to a second stack (such as a secondary stack in the same building), a drain pipe connected to the second stack, or a cleanout for the second stack. The controller receives signals from each pressure sensor and compares the two signals to a predetermined threshold (usually atmospheric pressure) or to each other (particularly for a two stack system) to determine whether there is a blockage to trigger the alarm.

Drain pressure alert systems according to preferred embodiments of the invention using pressure sensors provide early warning of pressure deviations which could occur in fluid or air handling systems such as drain systems in a kitchen, sink, showers, floors, toilets, and other water systems with potential drain blockages that lead to overflows or hydraulic systems for buildings with potential static pressure deviations that lead to mechanical failures or water treatment systems with potential static pressure deviations that lead to system failures or air handling systems with potential static pressure deviations that lead to system failures. Preferred pressure alert systems are electrical powered, but may also be battery powered, with customizable pressure sensors, wireless data transfer communication capabilities, and adaptive learning software for alerts which can include audible alerts, light pulses, or wireless communications options to increase customized alert status and insertable/retrofitted modules into current or new fluid or air handling systems.

According to another preferred embodiment, the sensors are acoustic/vibration sensors. Preferably, two or more acoustic/vibration sensors are connected to a vent stack, drain pipe, and/or cleanout in a plumbing system similar to the use of pressure sensors. The controller receives signals from the acoustic/vibration sensors indicating an acoustic signature in the plumbing system at the location of the particular vibration sensor. The controller compares the signals to a baseline acoustic signature (as a predetermined threshold) to see if the recorded signature varies from the set of baseline signatures, which would indicate an irregularity in the plumbing system. The controller may also evaluate the signatures from adjacent or nearby sensor nodes to determine where there is an irregularity in the plumbing system, which would indicate a blockage or buildup at a location between those sensor nodes. When the controller detects a blockage, an alarm is triggered.

Drain alert systems according to preferred embodiments of the invention using acoustic or vibration sensors provide early warning of system deviations based on acoustic signatures measured in fluid systems such as drain systems in a kitchen, sink, showers, floors, toilets, and other water systems with potential drain blockages that lead to overflows or other mechanical problems or failures. According to another preferred embodiment, one or more sensor nodes are smart sensors capable of wirelessly sending signals to the controller. According to yet another preferred embodiment, one or more sensor nodes are connected to a wireless network device that wirelessly sends the signal from the sensor to the controller.

According to another preferred embodiment, the alarm may be a visual indicator, such as a light, or an audible indicator, such as a bell or chime. Most preferably, there is an alarm associated with each sensor in the alert system to aid in locating the blockage in the various pipes in the plumbing system. Most preferably, the controller will take inputs from each sensor node installed in the system and automatically determine the approximate location of a blockage or buildup in the various pipes in the plumbing system.

Preferred alert systems are electrical powered, but may also be battery powered, with customizable sensors, wireless data transfer communication capabilities, and adaptive learning software for alerts which can include audible alerts, light pulses, or wireless communications options to increase customized alert status and insertable/retrofitted modules into current or new fluid systems.

BRIEF DESCRIPTION OF THE DRAWINGS

The system of the invention is further described and explained in relation to the following drawings wherein.

DESCRIPTION OF THE PREFERRED EMBODIMENTS

Figure 1:
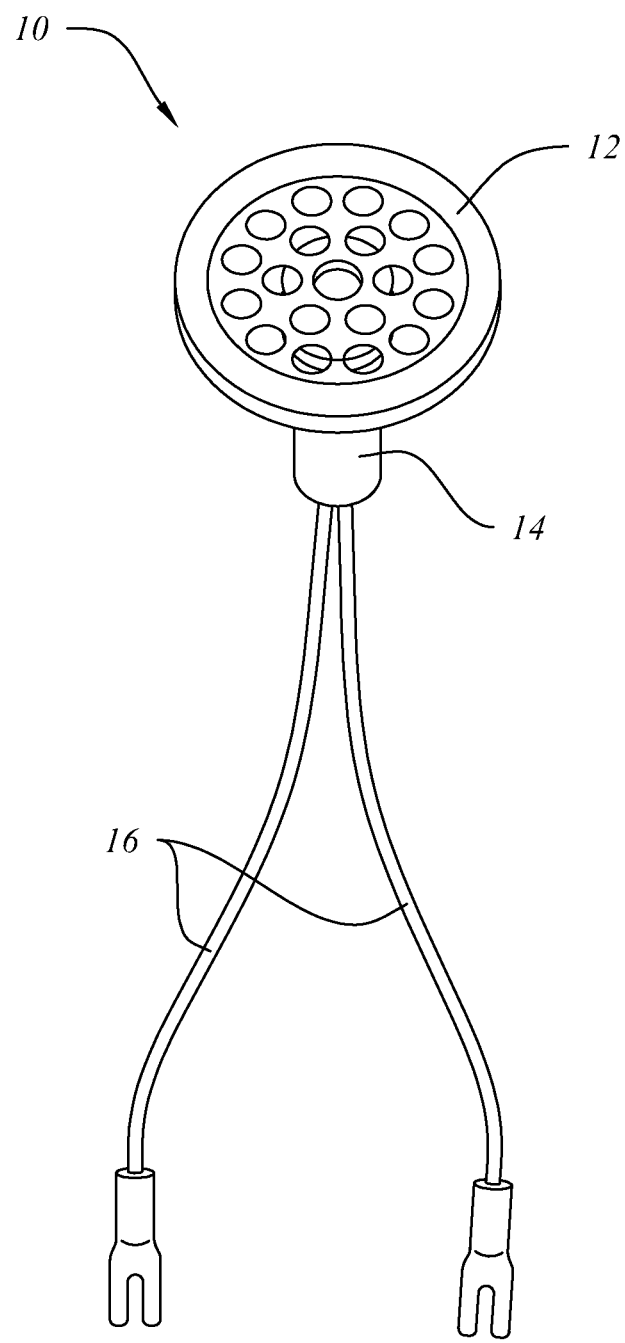
FIG. 1 is a perspective view of one preferred embodiment of a drain alert system according to the invention.
Figure 2A:
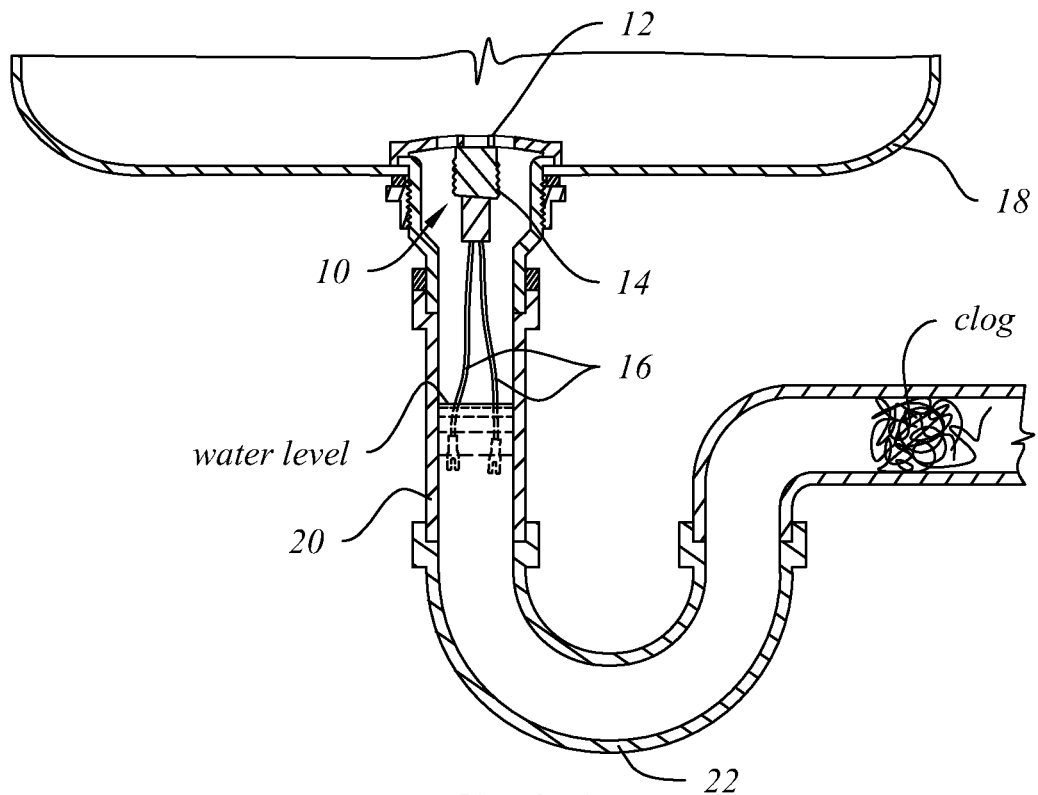
FIG. 2A is a cross-sectional view of the drain alert system of FIG. 1 shown in a drain pipe.

Referring to FIGS. 1-2A, a preferred embodiment of a drain alert system 10 is shown. Drain alert system 10 is an alert system based on detection of the presence of water in a drain pipe as an indicator of a downstream clog causing water to back-up in the drain pipe. Drain alert system 10 preferably comprises an alarm system 14 and conductive leads 16 that sense standing water. The alarm system 14, which is preferably a light (such as an LED) or device capable of making an audible sound (such as a beep), is disposed in or near a drain (and may be attached to an existing strainer on the drain, such as strainer 12) on an individual fixture, such as a sink, shower, or bathtub. The conductive leads 16 extend down the drain pipe 20, hanging from the alarm system 14 or the strainer 12, and send a signal to the alarm system 14 when the water level in the drain pipe rises above the location of the leads 16. Preferably, the leads 16 are long enough to extend down the drain pipe a distance from the top of the drain (or strainer 12) without making contact with the bottom of the P-trap 22 (if one exists on the drain). Alarm system 14 preferably comprises a power source, such as a battery. When water connects both leads, it activates the alarm system 14 to alert a user that there is a blockage in the drain or downstream of the drain that is causing the water to not drain properly. Another sensor may also optionally be connected to alarm system 14 and another component of the plumbing fixture, such as the faucet valves, to indicate when the fixture is in use and water is supposed to be flowing around leads 16 to avoid false alarms from the flowing water connecting the leads 16, as opposed to a backup of water from below connecting the leads when the fixture is not in use.

Figure 2B:
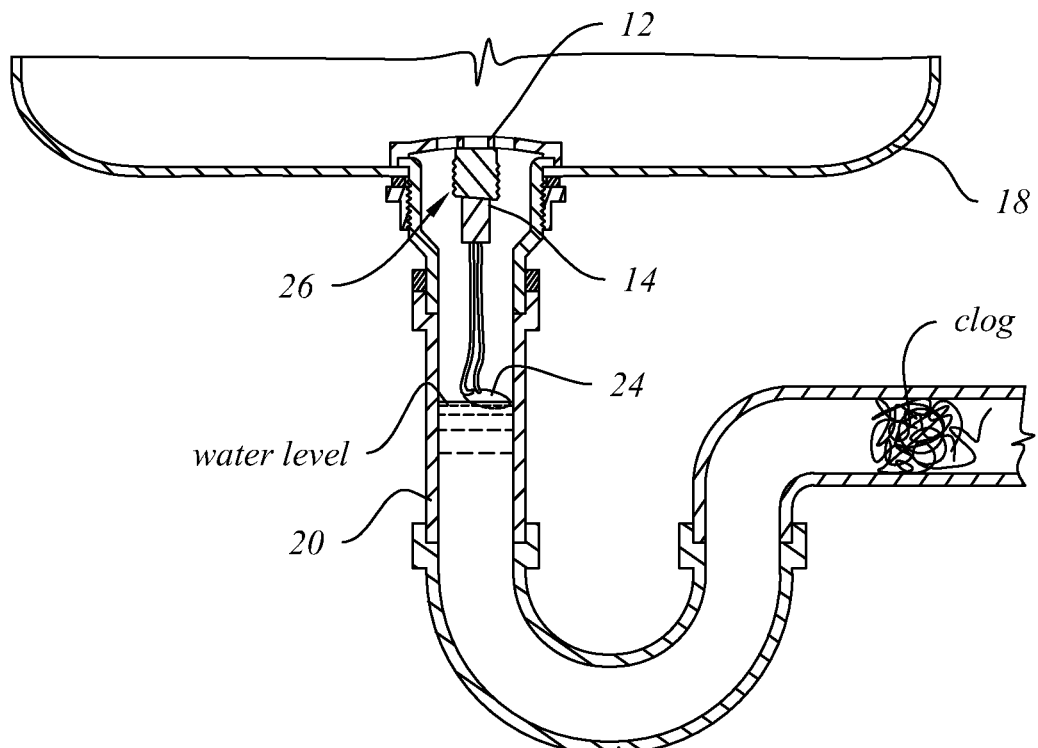
FIG. 2B is a cross-sectional view of another preferred embodiment of a drain alert system according to the invention.

Referring to FIG. 2B, another preferred embodiment of a drain alert system 26 is shown. Drain alert system 26 is an alert system based on detection of the presence of water in a drain pipe as an indicator of a downstream clog causing water to back-up in the drain pipe, similar to system 10. Drain alert system 26 preferably comprises an alarm system 14 and a float switch that is activated by an elevated water level. The alarm system 14, which is preferably a light (such as an LED) or device capable of making an audible sound (such as a beep), is disposed in or near a drain (and may be attached to an existing strainer on the drain, such as strainer 12) on an individual fixture, such as a sink, shower, or bathtub. The float switch extends down the drain pipe 20, hanging from the alarm system 14 or the strainer 12, and sends a signal to the alarm system 14 when the water level in the drain pipe rises above the location of the float 24. Preferably, the float switch guide tube is long enough to extend down the drain pipe a distance from the top of the drain (or strainer 12) without making contact with the bottom of the P-trap 22 (if one exists on the drain). Alarm system 14 preferably comprises a power source, such as a battery. When a water backup activates the float switch), it activates the alarm system 14 to alert a user that there is a blockage in the drain or downstream of the drain that is causing the water to not drain properly.

Figure 3:
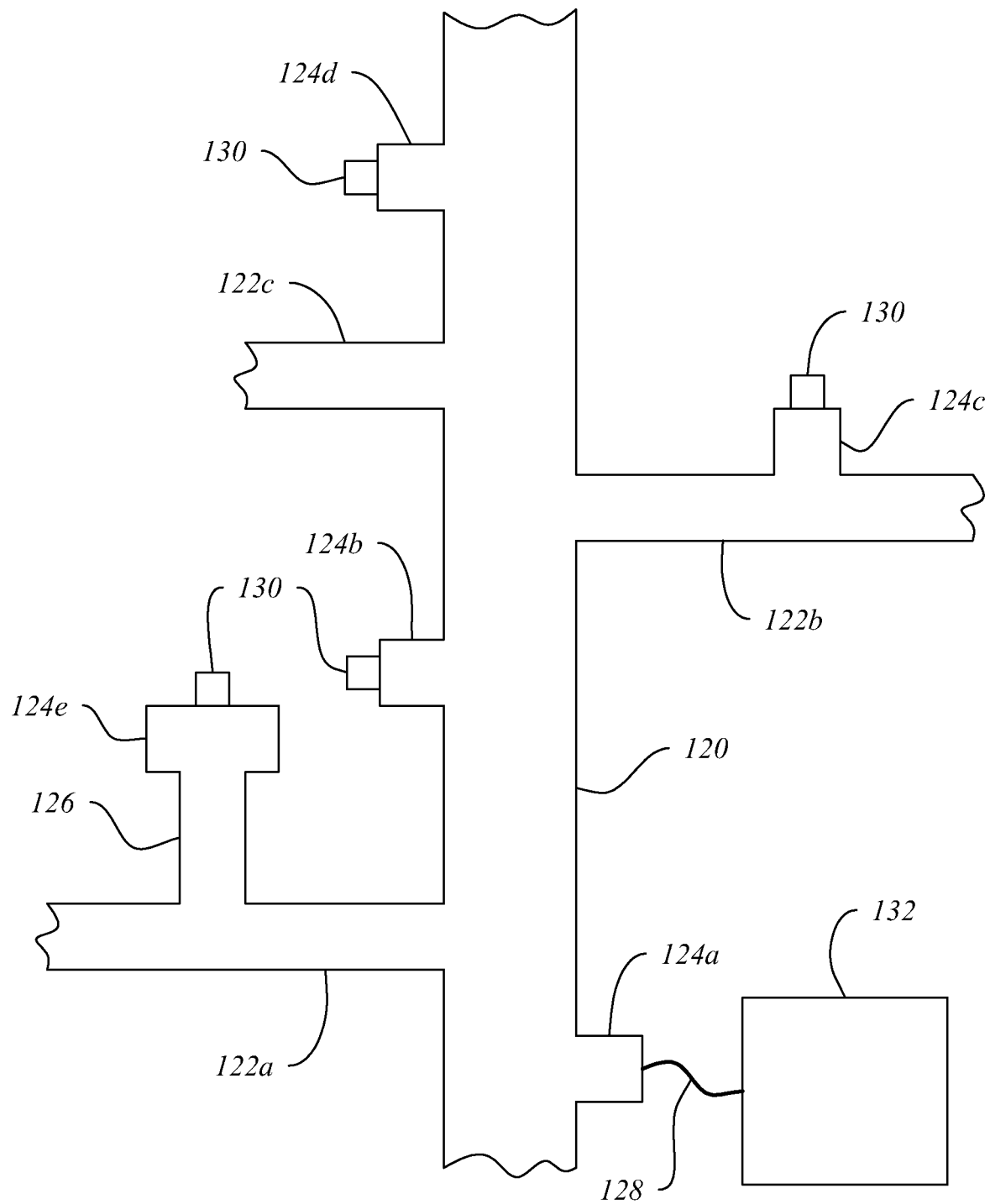
FIG. 3 is front elevation view of typical components in a plumbing system with another preferred embodiment of a drain alert system according to the invention.
Figure 4:
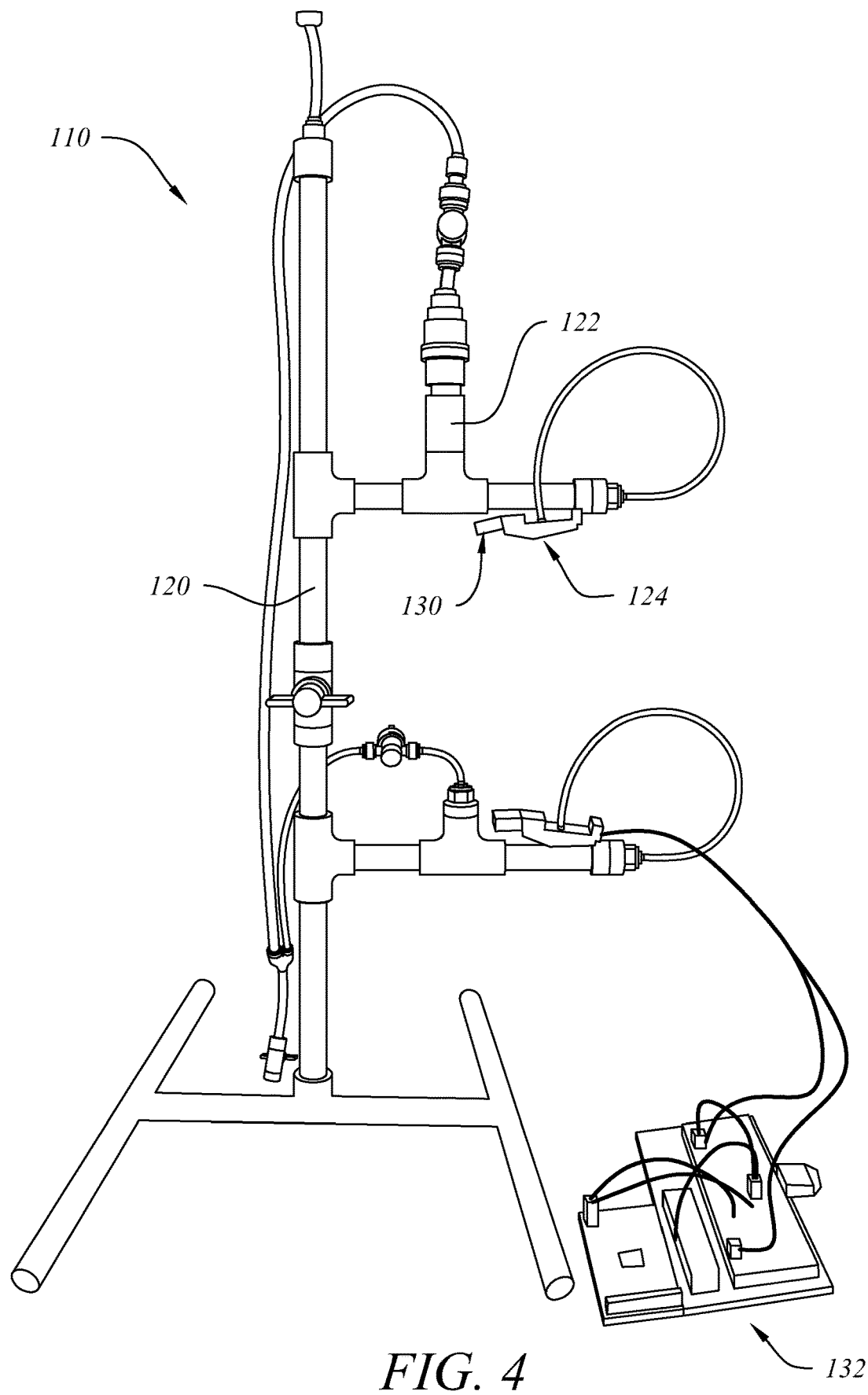
FIG. 4 is a front elevation view of a test device for simulating typical components in a plumbing system with one preferred embodiment of a drain alert system according to the invention.

Referring to FIG. 3, a preferred embodiment of another drain alert system 110 is shown with typical components found in a plumbing system. FIG. 4 shows a preferred embodiment of drain alert system 110 as connected to piping segments configured to simulate typical components for test purposes. The plumbing system configuration and connection points for alert system 110 shown in FIGS. 3 and 4 are exemplary only and system 110 may be used with other plumbing system configurations and with other connection points. Drain alert system 110 is an alert system based on detection of pressure and/or acoustic/vibration changes within a plumbing system. A clog in the system will result in a higher pressure in the plumbing system above (or upstream) the blockage and a partial vacuum in the plumbing system below (or downstream) the blockage. Similar acoustic/vibrations changes will occur when there is a clog in the system. A preferred embodiment of a drain alert system 110 comprises two or more sensors or sensor nodes 124 connected at various locations on a vent stack 120, on a drain pipe 122 connected to vent stack 120, and/or on a cleanout 126 within a plumbing system. Sensors 124 may be pressure sensors, acoustic/vibration sensors, or a combination of both. Each sensor 124 is connected to a controller 132 configured to receive signals from the sensors 124 corresponding to a measured parameter in stack 120, drain pipe 122, or cleanout 126 at the location of the particular sensor. For a pressure sensor 124, the measured parameter will be pressure and for an acoustic/vibration sensor 124, the measured parameter will be a detected sound or vibration. A sensor 124, such as sensor 124a, may be connected to controller 132 via a wired connection 128. A sensor 124, such as sensors 124b-124e, may also be connected to a wireless device 130 to wirelessly send signals to controller 132.

When a pressure sensor 124 is used, the controller 132 receives signals from the pressure sensors 124 indicating the pressure in the plumbing system at the location of the particular pressure sensor. The controller 132 compares the signals to a predetermined threshold value (usually atmospheric pressure, or a range of values to accommodate for small fluctuations in pressure) to determine if the pressure from each sensor is substantially at the threshold value or above or below the threshold value or range of values. The threshold values, monitoring time, and monitoring duration will be determined by analysis of the system histogram pressures from a site evaluation study. In most cases, the time interval (monitoring time) will correspond to the least active period in the system being assessed, such as but not limited to after mid-night and before 5:00 am local time. In plumbing systems having multiple vent stacks, controller 132 can also preferably compare signals from pressure sensors 124 from each vent stack sub-system within the plumbing system. A pressure measurement that is above or below the threshold value indicates there may be a blockage in the plumbing system. Controller 132 may send an alarm signal to a remote device (such as a text to a cell phone or an email) or trigger an audible or visual alarm (such as a beeping alarm or a flashing light) or combination thereof when the comparison indicates one or more of the sensors 124 is above or below the threshold so that a user can investigate the possible blockage.

Most preferably, controller 132 is programmed with a location for each sensor 124 or a relative location for each sensor 124 with respect to nearby or adjacent sensors. For example, sensor 124a is on a floor above sensor 124b. Most preferably, controller 132 is also programmed to compare pressure measurements from at least one sensor 124 to another sensor or other sensors nearby to aid determining an approximate location of the blockage within the plumbing system. For example, by determining that there is a partial vacuum detected at sensor 124c and a pressure higher than the threshold at sensor 124d, then the blockage is most likely located between those sensors, such as in drain pipe 122c. The comparison of pressure measurements from one sensor to that of a nearby or adjacent sensor is preferably only done when a pressure deviation is sensed using the comparison of the measurements to the predetermined threshold or range of values. Controller 132 is preferably configured to send data or information regarding the location of the potential blockage to a remote user, device, or computer or to display the data on a display screen accessible by a user. Alternatively, controller 132 may send data regarding all of the pressure sensor measurements to a remote device or remote computer or on a display screen accessible by a user so that the user can review the measurements to determine where the blockage is located. Controller 132 preferably has memory storage and so that a user can retrieve stored data regarding measured pressures, comparisons, or both. In another preferred embodiment, alert system 110 also comprises a user interface having a display screen to display data regarding measured pressures, comparisons, or both, preferably with buttons or the like to allow user inputs to retrieve stored data. An alert system 110 may also be used to detect leaks and an approximate location for a leak in a plumbing system (in supply lines or drain lines) in a similar manner as a blockage is detected, as will be understood by those of ordinary skill in the art.

In addition to or in place of pressure sensors 124, a preferred embodiment of a drain alert system 110 is capable of detecting acoustic signature changes within a plumbing system, as a clog in the system will result in a variation of the acoustic profile in the plumbing system above (or upstream) the blockage and in the plumbing system below (or downstream) the blockage. In this preferred embodiment, two or more sensor nodes 124 comprising an acoustic or vibration sensor are used instead of pressure sensors 124 or the two types of sensors may be used together. As with pressure sensors 124, acoustic/vibrations sensors 124 are connected at various locations on a vent stack 120, on a drain pipe 122 connected to vent stack 120, and/or on a cleanout 126 within a plumbing system. Each sensor node 124 is connected to a controller 132 configured to receive signals from the sensor nodes 124 corresponding to an acoustic measurement in stack 120, drain pipe 122, or cleanout 126 at the location of the particular sensor node. A sensor node 124, such as sensor 124a, may be connected to controller 132 via a wired connection 128. A sensor node 124, such as sensors 124b-124e, may also be connected to a wireless device 130 to wirelessly send signals to controller 132.

The controller 132 receives signals from the sensor nodes 124 indicating the acoustic profile in the plumbing system at the location of the particular sensor node. The controller 132 compares the signals to a set of identified acoustic signatures for normal operating conditions in the system to determine if the observed event varies from the set of acoustic profiles associated with normal operation. The acoustic profiles, monitoring time, and monitoring duration will be determined by analysis of the system over time from a site evaluation study. In most cases, the time interval (monitoring time) will correspond to the most active period in the system being assessed, such as but not limited to after 6:00 AM and before midnight local time. In plumbing systems having multiple vent stacks, controller 132 can also preferably compare signals from sensor nodes 124 from each vent stack sub-system within the plumbing system. A measurement that is outside of the identified set of normally occurring acoustic profiles indicates there may be a blockage or other abnormality in the plumbing system. Controller 132 may send an alarm signal to a remote device (such as a message to a cell phone or an email) or trigger an audible or visual alarm (such as a beeping alarm or a flashing light) or combination thereof when the comparison indicates one or more of the sensors 124 has observed a nonconforming event so that a user can investigate the possible blockage.

Most preferably, controller 132 can independently determine the location of or be programmed with a location for each sensor 124 or a relative location for each sensor 124 with respect to nearby or adjacent sensors. For example, sensor 124*a* is on a floor above sensor 124*b*. Most preferably, controller 132 is also programmed to compare event measurements from at least one sensor 124 to another sensor or other sensors nearby to aid determining an approximate location of the blockage within the plumbing system. For example, by determining that an abnormal acoustic event has occurred at sensor 124*c* and a normal acoustic event has occurred at sensor 124*d*, then the blockage is most likely located between those sensors, such as in drain pipe 122*c*. The comparison of acoustic measurements from one sensor to that of a nearby or adjacent sensor is preferably done each time an event is detected. Controller 132 is preferably configured to send data or information regarding the location of the potential blockage to a remote user, device, or computer or to display the data on a display screen accessible by a user. Alternatively, controller 132 may send data regarding all of the sensor measurements to a remote device or remote computer or on a display screen accessible by a user so that the user can review the measurements to determine where the blockage is located. Controller 132 preferably has memory storage and so that a user can retrieve stored data regarding acoustic measurements, pressure measurements, comparisons, or both. In another preferred embodiment, alert system 110 also comprises a user interface having a display screen to display data regarding acoustic measurements, comparisons, or both, preferably with a navigable user interface to allow user inputs to retrieve stored data. An alert system 110 may also be used to detect leaks and an approximate location for a leak in a plumbing system (in drain lines) in a similar manner as a blockage is detected, as will be understood by those of ordinary skill in the art.

Figure 5:
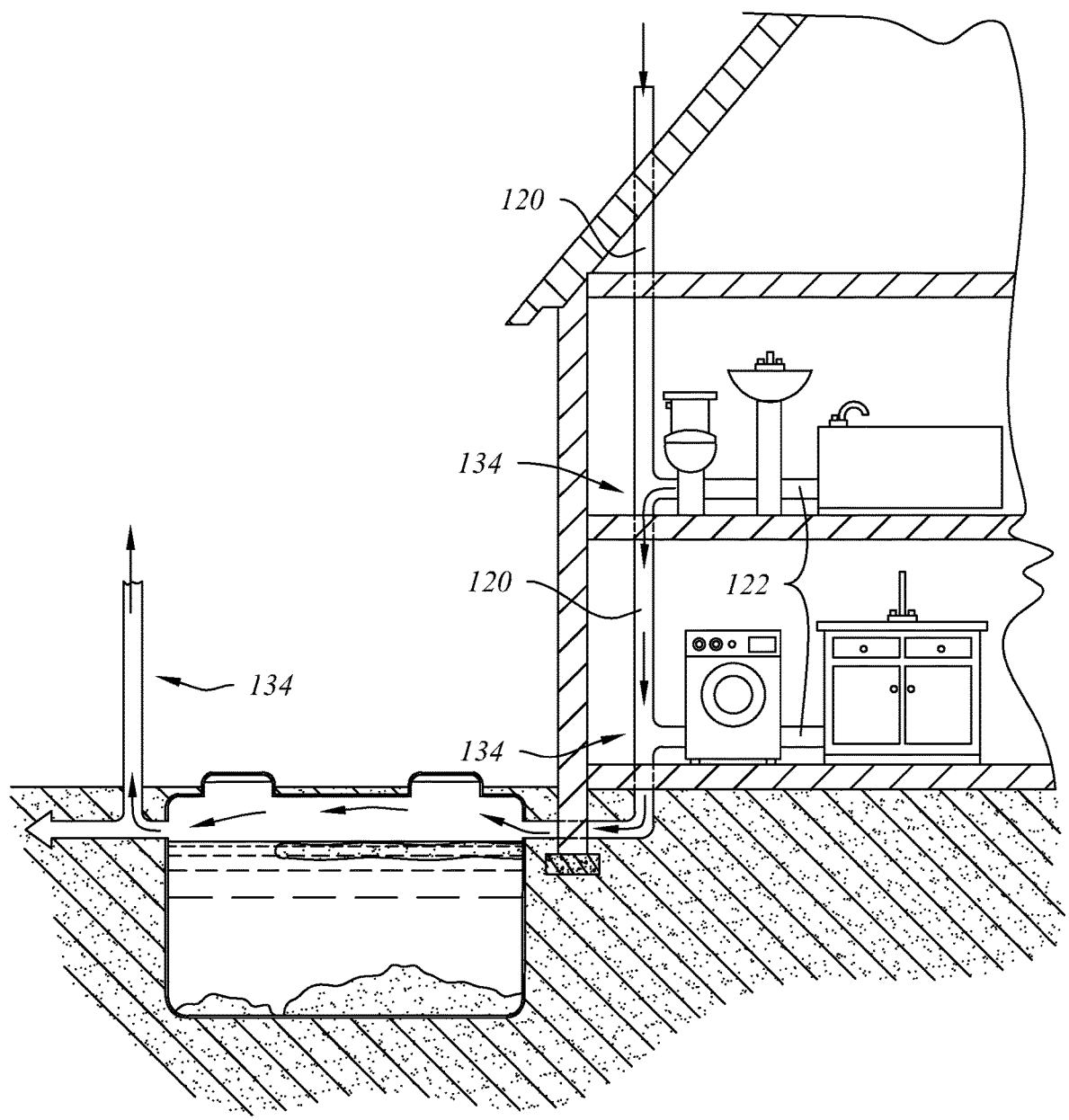
FIG. 5 is a schematic of a household plumbing system showing possible locations for sensors according to a preferred embodiment of a drain alert system.

FIG. 5 shows a schematic of a household pluming system including a vent stack 120 and drain pipes 122. Shown in areas 134 are possible locations for acoustic sensors and/or pressure sensors 124 for use with system 110. These locations are exemplary and other locations may also be used and system 110. Additionally, the plumbing systems depicted in the figures are exemplary and system 110 may be used with other plumbing system configurations and components. System 110 is particularly useful in multi-story and high rise buildings with large plumbing systems where it can be difficult to determine a location for a blockage.

Systems similar to alert system 110 may also be used to detect acoustic changes in a fluid filtration system, which indicate that a filter needs to be cleaned or replaced. Sensor nodes may be placed upstream and/or downstream of a filter or of multiple filters in a fluid system. Variations in the acoustics upstream and/or downstream of a filter as compared to each other or to the baseline acoustic signature may be used to indicate that a filter needs replacing or cleaning. Variations between acoustic measurements at different locations may also indicate that a filter in a particular location needs replacing or cleaning.

Additionally systems similar to alert system 110 may also be used to detect pressure changes in a fluid filtration system, including water and air handling systems, which indicate that a filter needs to be cleaned or replaced. Pressure sensors may be placed upstream and/or downstream of a filter or of multiple filters in a fluid system. Variations in the pressure upstream and/or downstream of a filter as compared to each other or to a threshold or range of values may be used to indicate that a filter needs replacing or cleaning. Variations between pressure readings at different locations may also indicate that a filter in a particular location needs replacing or cleaning.

A preferred method of detecting a blockage in a plumbing system using pressure sensors comprises measuring the pressure at two or more locations within the plumbing system, comparing the measured pressures to a threshold value or range of values, and sending a signal to a remote user or remote computer or triggering an alarm when at least one of the measured pressures is above or below the threshold value or outside the range of values. Another preferred method further comprises identifying an approximate location of the blockage with the plumbing system by comparing at least one measured pressure from one location to another measured pressure at nearby or adjacent location and sending a signal to the remote user or remote computer identifying an approximate location of a blockage within the plumbing system as being in the piping between two locations when the measured pressure at one of those locations is above the threshold or range of values and the measured pressure at the other location is below the threshold or range of values. According to another preferred embodiment, data regarding the measured pressures, the comparisons to the threshold or range of values, the comparisons of measured pressures from nearby or adjacent locations, the approximate location of the blockage, or a combination thereof is played on a display screen for a user to view. According to another preferred embodiment, a comparison of measured pressures at two nearby or adjacent locations is only made when at least one of the measured pressures is above or below the threshold or outside of the range, and more preferably is only made when at least one of the measured pressures is above the threshold or above of the range and at least one other of the measured pressures is below the threshold or below the range. The methods of detecting a blockage are preferably carried out using preferred embodiments of the drain pressure alert system of the invention. Method of detecting a leak in a plumbing system or need for a filter cleaning/replacement in a fluid filtration system would be similarly carried out.

A preferred method of detecting a blockage in a plumbing system using acoustic or vibration sensors comprises recording acoustic events at two or more locations within the plumbing system, comparing the acoustic profiles of the events to an identified set of normal acoustic profiles for the plumbing system (acoustic profiles during normal operation of the plumbing system when there are no clogs or blockages), and sending a signal to a remote user or remote computer or triggering an alarm when at least one of the measured acoustic profiles does not match the set of identified normally occurring acoustic profiles. Another preferred method further comprises identifying an approximate location of the blockage with the plumbing system by comparing at least one measured acoustic event from one location to another measured acoustic event at nearby or adjacent location and sending a signal to the remote user or remote computer identifying an approximate location of a blockage within the plumbing system as being in the piping between two locations when the measured acoustic event at one of those locations does not match the set of identified normally occurring acoustic profiles. According to another preferred embodiment, data regarding the measured acoustic events, the comparisons to the baseline acoustic signature, the approximate location of the blockage, or a combination thereof is played on a display screen for a user to view. The methods of detecting a blockage are preferably carried out using preferred embodiments of the drain alert system of the invention. Methods of detecting a leak in a plumbing system or need for a filter cleaning/replacement in a fluid filtration system would be similarly carried out.

References herein to calculating, measuring, or comparing a value or property and the like are intended to include any form of direct measurement, converting data or a signal, making a calculation based on one or more data points or signals, or otherwise comparing, interpreting, correlating, or manipulating one or more data points or signals. Although discussed herein primarily with plumbing systems, drain alert systems according to the invention can also be used in air handling, water treatment, plumbing, hydraulic, and similar systems through which liquids and gases flow through pipes or conduits that may experience a full or partial blockage. Those of ordinary skill in the art will also appreciate upon reading this specification and the description of preferred embodiments herein that other modifications and alterations to the device and method may be made within the scope of the invention and it is intended that the scope of the invention disclosed herein be limited only by the broadest interpretation of the appended claims to which the inventors are legally entitled.

We claim:

1. A drain alert system for detecting changes indicating a blockage in a building drain system comprising a drain pipe, the drain alert system comprising:
   two or more sensors, each sensor connected to the drain pipe, a stack, a cleanout, or a combination thereof in the building drain system to measure a parameter within the drain system at a location of the sensor;
   a control system configured to receive signals from the sensors, compare the measured parameter from each sensor to a threshold value or range of values, and send a signal to a remote user or remote device or trigger an alarm indicating a blockage in the drain pipe or the stack when at least one of the measured parameters is above or below the threshold value or outside the range of values; and
   wherein (1) the sensors are pressure sensors and the parameter is a pressure, or (2) the sensors are acoustic or vibration sensors and the parameter is an acoustic profile, or (3) a combination thereof.

2. The drain alert system of claim 1 wherein the control system is further configured to compare the measured parameter from at least one sensor to another sensor in an adjacent location within the drain system to identify an approximate location of the blockage within the drain system.

3. The drain alert system of claim 1 wherein the control system is further configured to identify an approximate location of the blockage within the drain system, wherein the approximate location is between a location of a first sensor having a measured parameter above the threshold or range of values and a second sensor having a measured parameter below the threshold or range of values.

4. The drain alert system of claim 2 further comprising a display to display data regarding the measured parameters, the comparisons to the threshold or range of values, the comparisons of measured parameters from adjacent sensors, the approximate location of the blockage, or a combination thereof.

5. The drain alert system of claim 1 wherein the signal from at least one sensor is sent to the control system wirelessly.

6. A method of detecting a blockage in a building drain system comprising a drain pipe, the method comprising the following steps:
   measuring a parameter at two or more locations within the drain pipe, a stack, a cleanout, or a combination thereof within the building drain system;
   comparing the measured parameter from at least a first location to a threshold value or range of values; and
   sending a signal to a remote user or remote device or triggering an alarm when the comparing step indicates there is a blockage; and
   wherein the parameter is a pressure or an acoustic profile.

7. The blockage detection method of claim 6 further comprising comparing the measured parameter from the first location to the measured parameter at a second location.

8. The blockage detection method of claim 7 further comprising sending a signal to the remote user or remote device identifying an approximate location of the blockage as upstream or downstream of the first location within the drain system.

9. The blockage detection method of claim 6 further comprising comparing the measured parameter from a second location to the threshold value or range of values and sending a signal to the remote user or remote device identifying an approximate location of the blockage as between the first location and the second location when (1) the measured pressure at the first location is above the threshold or range of values and the measured pressure at the second location is below the threshold or range of values or (2) the measured acoustic profile at location is outside the range of values and the measured acoustic profile at the second location is within the range of values or (3) a combination thereof.

10. The blockage detection method of claim 7 further comprising displaying data regarding the measured pressures or acoustic profiles, the comparisons to the range of values, the comparisons of measured pressures or acoustic profiles from the first and second locations, the approximate location of the blockage, or a combination thereof.

11. The blockage detection method of claim 7 wherein the comparison of measured pressures or acoustic profiles at the first and second locations is only made when at least one of the measured pressures or acoustic profiles at the first location is above or below the threshold or outside of the range.

12. The blockage detection method of claim 7 wherein the comparison of measured pressures at the first and second locations is only made when at least one of the measured pressures at the first location is above the threshold or above of the range and at least one of the measured pressures at the second location is below the threshold or below the range; and wherein the range is atmospheric pressure or near atmospheric pressure.

13. An alert system for detecting when a filter through which fluid in a fluid filtration system flows needs to be cleaned or replaced, the alert system comprising:
   a first sensor connected to a pipe or conduit downstream of the filter to measure a parameter within the fluid filtration system at a location of the first sensor;
   a control system configured to receive signals from the first sensor, compare the measured parameter from the first sensor to a threshold value or range of values and to send a signal to a remote user or remote device or trigger an alarm when at the measured parameter is above or below the threshold value or outside the range of values indicating the filter needs to be cleaned or replaced; and
   wherein (1) the first sensor is a pressure sensors and the parameter is a pressure, or (2) the first sensor is an acoustic or vibration sensor and the parameter is an acoustic profile.

14. The alert system of claim 13 wherein the fluid is air and (1) the threshold value is atmospheric pressure or a range of pressures near atmospheric pressure when the sensors are pressure sensors or (2) the threshold value is a baseline acoustic profile obtained during normal operation of the air filtration system when the filter is new or has been cleaned or a range of acoustic profiles obtained during normal operation of the air filtration system when the filter is new or has been cleaned when the sensors are acoustic or vibration sensors.

15. The alert system of claim 13 further comprising:
a second sensor connected to a pipe or conduit upstream of the filter to measure a parameter within the fluid filtration system at a location of the second sensor; and
wherein the control system is configured to receive signals from the second sensor, to compare the measured parameter from the second sensor to the measured parameter from the first sensor to determine a change of parameters across the filter, to compare the change of parameters across the filter to a threshold value or range of values, and to send a signal to a remote user or remote device or trigger an alarm when the measured change of parameters across the filter is above or below the threshold value or outside the range of values indicating the filter needs to be cleaned or replaced; and
wherein (1) the second sensor is a pressure sensor and the parameter is a pressure, or (2) the second sensor is an acoustic or vibration sensor and the parameter is an acoustic profile.

16. A method of detecting when a filter through which a fluid in a fluid filtration system flows needs to be cleaned or replaced, the method comprising:
periodically measuring the pressure or acoustic profile at a first location downstream of and adjacent to at least a first filter;
optionally periodically measuring the pressure or acoustic profile at a second location upstream of and adjacent to the first filter;
comparing the measured pressure or acoustic profile from the first location to a threshold value or range of values or comparing the measured pressure or acoustic profile from the first location to the optional measured pressure or acoustic profile of the second location to determine a pressure drop across the filter or a change in acoustic profile across the filter; and
sending a signal to a remote user or remote device or triggering an alarm when the comparing step indicates the first filter needs to be replaced or cleaned.

17. The method of claim 16 wherein the filtration system comprises a plurality of filters, the method further comprising:
periodically measuring the pressure or acoustic profile at a third location downstream of and adjacent to a second filter;
optionally periodically measuring the pressure or acoustic profile at a fourth location upstream of and adjacent to the second filter and determining a pressure drop or change in acoustic profile across the second filter;
comparing (1) the measured pressure or acoustic profile from the third location to the threshold value or range of values, (2) one or more of the measured pressures or optional pressure drop from the first filter to the second filter, or (3) one or more of the measured acoustic profiles or change in acoustic profile across the first filter to the second filter; and
sending a signal to a remote user or remote device or triggering an alarm when the comparing step indicates the first or second filter needs to be cleaned or replaced.

18. The method of claim 17 further comprising displaying data regarding the measured pressures or acoustic profiles, the comparisons of pressures or acoustic profiles, pressure drop, change in acoustic profile, the approximate location of the blockage, or a combination thereof.

19. The drain alert system of claim 1 wherein the sensor is a pressure sensor and the control system is further configured to identify an approximate location of the blockage within the drain system as (1) downstream of the pressure sensor when the measured pressure is higher than the threshold or (2) upstream of the pressure sensor when the measured pressure is lower than the threshold.

20. The drain alert system of claim 1 wherein a first sensor is connected to a first stack, a drain pipe connected to the first stack, or a cleanout connected to the first stack and a second sensor is connected to a second stack a drain pipe connected to the second stack, or a cleanout connected to the second stack; and
wherein the control system is further configured to compare the measured parameter from at the first sensor to the measured parameter from the second sensor.

21. The drain alert system of claim 2 wherein the measured parameter is an acoustic profile.

22. The drain alert system of claim 3 wherein the measured parameter is pressure and the range of values is atmospheric pressure or near atmospheric pressure.

23. The drain alert system of claim 2 wherein the parameter is pressure and the approximate location is between a location of a first sensor and a second sensor when (1) the measured pressure at the first sensor is above the range of values and the measured pressure at the second sensor is lower than the measured pressure at the first sensor or (2) the measured pressure at the first sensor is below the range of values and the measured pressure at the second sensor is higher than the measured pressure at the first sensor.

24. The method of claim 6 further comprising identifying an approximate location of the blockage as-between the first location and a second location when the measured pressure at the first location is above the range of values and the measured pressure at the second location is below the range of values; and
wherein the range of values is atmospheric pressure or near atmospheric pressure.

25. The method of claim 6 wherein the comparing step indicates there is a blockage when at least one of the measured pressures or acoustic profiles is above or below the threshold value or outside the range of values.

26. The method of claim 6 further comprising establishing the threshold value or range of values by (1) measuring pressures in the building drain system during a time of day when the drain system is least active when the parameter is pressure or (2) measuring acoustic profiles in the building drain system during a time of day when the drain system is most active when the parameter is acoustic profile.

27. The method of claim 26 wherein the time of day is between midnight and 5 a.m. local time when the parameter is pressure and between 6 a.m. and midnight local time when the parameter is acoustic profile.

28. The method of claim 7 wherein the measured parameter is pressure and the range of values is atmospheric pressure or near atmospheric pressure.

29. The method of claim 7 wherein the measured parameter is an acoustic profile.

30. The method of claim 15 wherein the first sensor is a pressure sensor and the second sensor is a pressure sensor; wherein the measured parameter is pressure and the range of values is atmospheric pressure or near atmospheric pressure.

31. The method of claim 16 further comprising cleaning or replacing the filter in response to the signal or alarm.

32. The method of claim 16 further comprising displaying data regarding the measured pressures or acoustic profiles, the comparisons of pressures or acoustic profiles, or a combination thereof.

33. The method of claim 16 wherein the comparing step indicates the first filter needs to be replaced or cleaned when (1) the measured pressure or acoustic profile from the first location is above or below a first threshold value or outside a first range of values or (2) the measured pressure drop or change in acoustic profile across the first filter is above or below a second threshold or second range of values.

34. The method of claim 17 wherein the comparing step comprises:
comparing the measured pressure or acoustic profile from the third location to the threshold value or range of values and comparing (a) one or more of the measured pressures or optional pressure drop from the first filter to the second filter or (b) one or more of the measured acoustic profiles or optional change in acoustic profile across the first filter to the second filter.

35. The drain alert system of claim 19 wherein the threshold is near atmospheric pressure.

36. A method of detecting a blockage in a building drain system comprising a drain pipe, the method comprising the following steps:
periodically measuring a pressure with at least one sensor located within the drain pipe, a stack, or a cleanout within the drain system;
comparing one or more of the measured pressures to a threshold value or range of values;
sending a signal to a remote user or remote device or triggering an alarm when at least one of the measured pressures is above or below the threshold value or outside the range of values; and
determining an approximate location of the blockage as downstream of the pressure sensor when the measured pressure is higher than the threshold or upstream of the pressure sensor when the measured pressure is lower than the threshold.

37. A drain alert system for detecting changes indicating a blockage in a building drain system comprising a drain pipe, the drain alert system comprising:
two or more sensors, each sensor connected to the drain pipe, a stack, a cleanout, or a combination thereof in the building drain system to measure a parameter within the drain system at a location of the sensor;
a control system configured to (1) receive signals from the sensors, (2) compare the measured parameter from at least a first sensor to a threshold value, a range of values, or the measured parameter from a second sensor, and (3) send a signal to a remote user or remote device or trigger an alarm indicating a blockage in the drain pipe or the stack when at least one of the measured parameters from the first sensor is above or below the threshold value, outside the range of values, or there is a differential in the measured parameter of the first sensor and the measured parameter of the second sensor; and
wherein (1) the sensors are pressure sensors and the parameter is a pressure, or (2) the sensors are acoustic or vibration sensors and the parameter is an acoustic profile, or (3) a combination thereof.

38. The drain alert system of claim 37 wherein a first sensor is connected to a first stack, a drain pipe connected to the first stack, or a cleanout connected to the first stack and a second sensor is connected to a second stack a drain pipe connected to the second stack, or a cleanout connected to the second stack; and
wherein the control system is configured to compare the measured parameter from at the first sensor to the measured parameter from the second sensor.

39. A method of detecting when a filter through which fluid in an fluid filtration system needs to be cleaned or replaced, the method comprising:
periodically measuring a parameter at a first location downstream of the filter;
optionally periodically measuring the parameter at a second location upstream of the filter; and
(1) comparing the measured parameter from the first location to a threshold value or range of values and sending a signal to a remote user or remote device or triggering an alarm when the measured parameter from the first location is above or below the threshold value or outside the range of values or (2) determining if there is a variation between the measured parameter at the first location and the optional measured parameter at the second location and sending a signal to a remote user or remote device or triggering an alarm the variation indicates the filter needs to be replaced or cleaned; and
wherein the parameter is a pressure or an acoustic profile.

40. A method of detecting when a filter through which a fluid in a fluid filtration system flows needs to be cleaned or replaced, the method comprising:
periodically measuring a parameter at a location in the fluid filtration system, wherein the parameter is a pressure or acoustic profile or both and wherein the location is upstream of one or more filters, or downstream of one or more filters, or both;
optionally determining a pressure drop or change in acoustic profile across one or more filters by comparing the measured pressure or acoustic profile upstream of one of the filters to the measured pressure or acoustic profile downstream of one of the filters;
comparing (1) the measured parameter at a first location with the measured parameter at a second location, (2) the measured parameter at a first location to a previously measured parameter at the first location, (3) the optional pressure drop from one filter to a measured pressure at a location for another filter or to the optional pressure drop of another filter, (4) the optional pressure drop from one filter to a previously determined pressure drop from the same filter, (5) the optional acoustic change from one filter to a measured acoustic profile of another filter or to the optional acoustic change of another filter, (6) the optional acoustic change from one filter to a previously determined acoustic change from the same filter; and
sending a signal to a remote user or remote device or triggering an alarm when any comparison is above or below a threshold value or outside the range of values.

\* \* \* \* \*